April 7, 1964   M. ALLARD ETAL   3,127,770
METHOD AND APPARATUS FOR MEASURING THE OUTPUT OF
A PULVERULENT MATERIAL SUSPENDED IN A FLUID
Filed Feb. 27, 1959
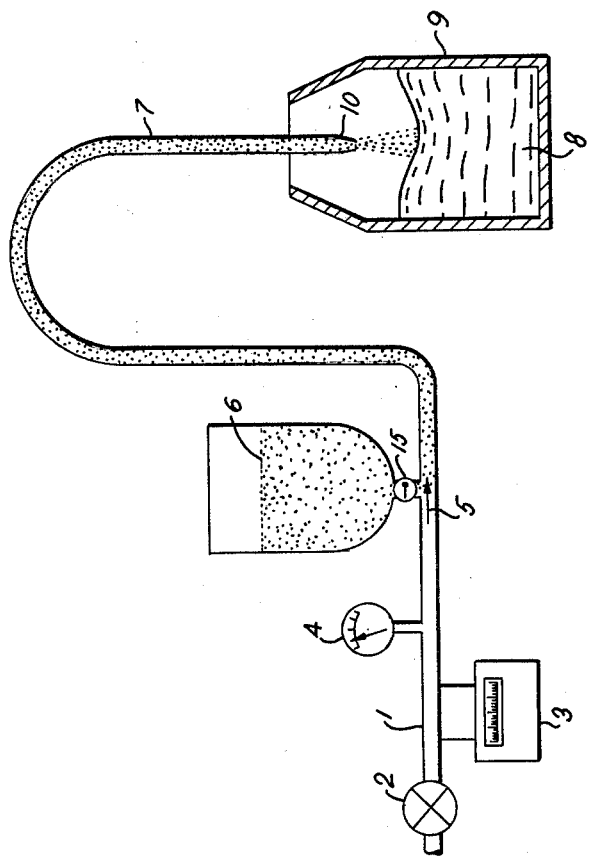
INVENTORS
Marc Allard
Bernard Trentini
BY Michael S. Striker
Atty United States Patent Office 3,127,770
Patented Apr. 7, 1964

3,127,770
METHOD AND APPARATUS FOR MEASURING THE OUTPUT OF A PULVERULENT MATERIAL SUSPENDED IN A FLUID
Marc Allard and Bernard Trentini, Saint Germain-en-Laye, France, assignors to Institut de Recherches de la Sidérurgie, Saint Germain-en-Laye, France, a professional institution
Filed Feb. 27, 1959, Ser. No. 795,962
Claims priority, application France Mar. 6, 1958
4 Claims. (Cl. 73—194)

It is well-known that numerous techniques, particularly siderurgical techniques, employ a suspension of pulverulent material in a fluid, generally a gaseous fluid.

It is also well-known that the major part of such techniques would be vastly improved by an accurate knowledge of the instantaneous output of pulverulent material suspended in the fluid and, possibly also, of the output of the conveying fluid.

Certain apparatus providing for the suspension of pulverulent material in a gaseous fluid will ensure, with a degree of accuracy depending on the conditions of use, a predetermined throughput of said pulverulent material; this is the case when an apparatus is used incorporating a volumetric distributor provided with a number of chambers. Other types of apparatus distributing pulverulent material do not permit, by reason of their actual design, measuring the output of pulverulent material.

Numerous attempts have been made at measuring the output of pulverulent material conveyed by a fluid, by introducing into the circuit, on the downstream side of the apparatus providing for the formation of the suspension, well-known arrangements such as diaphragms, venturis or nozzles. These arrangements exhibit the major drawback of providing accurate measurements only when the gas pressure remains constant in the area in which the measurement is carried out. In the most frequent cases, it is necessary to make said pressure vary and, whereas it is an easy matter to correct the indications of the flowmeter as a function of pressure when the fluid does not contain any pulverulent material, said correction becomes practically impossible when a pulverulent material is suspended in a gaseous fluid, since the theoretical laws of fluid mechanics are not applicable to such a suspension.

Furthermore, the arrangements referred to, since they disturb the flow of the fluid, are likely to lead to the deposition of dust (i.e. some of the suspended particles) which detrimentally affects the accuracy of the measurements.

The present invention has for its object to overcome these difficulties and to measure the instantaneous throughput of pulverulent material suspended in a fluid, whenever the heterogeneous fluid flows through a circuit or through a portion of a circuit, the characteristic properties of which remain substantially unchanged.

For this purpose, the invention comprises a method and apparatus for measuring a throughput of pulverulent material suspended in a fluid, consisting chiefly in producing, at a first predetermined point of the circuit, a constant pressure for a predetermined fluid output and in defining the relationship between the values of the output of pulverulent material to be measured and the pressure at a second predetermined point of the circuit of said fluid.

A large number of experiments made by ourselves on such circuits have shown that, for a predetermined output of the carrier fluid, there exists a relationship, which may be obtained through a preliminary gauging, between the instantaneous output of a given pulverulent material and the pressure as read at the predetermined point, provided the speed of heterogeneous fluid is such that no deposit is formed in the circuit.

One or more of the following features may be incorporated with the method and apparatus according to the invention, to wit:

The point at which the pressure remains constant in the circuit through which the heterogeneous fluid passes is located at one of the ends of said circuit;

The end of the circuit under constant pressure opens into the atmosphere;

The point at which the pressure remains constant is a point of the circuit where the speed of the conveying fluid is equal to the speed of sound and the point at which the pressure is measured is on the upstream side of the point under constant pressure.

An advantage of the method and apparatus according to the invention will be found in the fact that no differential pressure gauge is used, since the reading of such gauges is always somewhat hazardous in the case of a circuit in which flows a suspension of pulverulent material. A further advantage of the method and apparatus resides in the possibility of locating the measuring instruments in the circuit of the carrier fluid upstream of the point at which the pulverulent material is introduced.

In order to permit the invention to be more readily understood, an embodiment will now be disclosed by way of example only, reference being made to the accompanying diagrammatic drawing wherein:

The figure is a diagrammatic view of the injection circuit in the particularly important case of the refining of cast iron through a lance opening freely over the surface of the bath to blow into the latter a mixture of oxygen and pulverulent lime.

As apparent from inspection of the figure, the conveying fluid, which in the case of the present example is oxyen, enters through the pipe 1. The throughput of said fluid is adjusted by the valve 2 and is measured by the flowmeter 3, while its pressure is measured by the pressure gauge 4. Pulverulent lime is introduced into the pipe at point 5 through the feeding apparatus 6 and the tuyère 7 injects the lime into the metal bath 8 carried inside the container 9. The end 10 of the tuyère which is subjected to atmospheric pressure forms the point of the circuit subjected to an unvarying pressure.

The satisfactory performance of the above-mentioned metallurgical procedure requires an accurate knowledge of the total weight of lime blown into the bath, so that the refining may be finished at a temperature defined by the conditions of casting and a slag of a predetermined basic composition may be obtained. Furthermore, it is necessary to give the instantaneous throughputs of pulverulent lime suitable values for the different stages of the operation.

Thus, during this refining operation, the first stage requires a throughout of pulverulent lime equal to, say 40 kg. per minute and a throughput of oxygen of 12 cubic meters per minute, the throughput of oxygen being adjusted to said value. The feeding apparatus 6 is adjusted by means of a feed control such as gate 15, so as to maintain the indications of the gauge 4 at a value of 5.2 kg. per sq. cm. which is the value obtained in prior experiments as corresponding to the desired throughput of lime. Said adjustment is maintained at a constant value during the first three minutes.

The dangerous period leading to projections of bath particles at the end of the silicon-removing stage being finished, it is possible to reduce the incorporation of lime and, during the four following minutes, oxygen is blown at the same rate of 12 cubic meters per minute, while the throughput of lime is reduced to 24 kg. per minute. Prior experiments have shown that it is necessary to maintain now the pressure measured by the pressure gauge 4 at a value of 4 kg. per sq. cm. The throughput of oxygen is then reduced to 10 cubic meters per minute and the throughput of lime to 18 kg. per minute, the pressure read on the pressure gauge 4 being maintained to this end at a value of 3.1 kg. per sq. cm.

For the entire duration of 12 minutes corresponding to these three successive periods, it has been possible to blow into the container 9 in accordance with a predetermined schedule, an amount of lime closely approximating the desired amount of 310 kg. of pulverulent lime and 135 cubic meters of oxygen. The great adaptability of the method for measuring the throughput of pulverulent lime according to the invention has allowed a quiescent progression of the operation, the obtention of the desired temperature which is 1,620° C. and low contents of iron oxide in the final slag, so as to limit the loss of metal.

The above is intended merely as a single example, not a uniformly prescribed procedure. For different types of molten iron and different final temperature and refined metal composition, the amount of weight of lime, volume of oxygen, pressures and treating times will be modified as indicated by practical trials.

Obviously, even if there does not exist already a point subjected to an unvarying pressure or even if such point exists, as in the illustrated case, it may be advantageous to produce another such point which is nearer the apparatus blowing in the pulverulent material; to this end, and, in such a case, only the portion of the circuit between said blowing apparatus and said point under constant pressure requires having practically unvarying characteristic properties.

What we claim is:

1. A method for measuring the throughput of pulverulent material introduced and suspended in a carrier fluid flowing at a constant rate of flow through a predetermined circuit, consisting in causing a first predetermined point of said circuit located downstream of the point of introduction of said pulverulent material to be subjected to a constant pressure for any predetermined fluid output; causing indication of the amount of carrier fluid flowing through said circuit at a second point of said circuit located upstream of said point of introduction of said pulverulent material; adjusting at a third point located upstream of said second point of said circuit the flow of said carrier fluid in such a manner that it flows at a constant rate at said second point of said circuit; causing indication of the pressure of said fluid at a point of the circuit located between said third point of said circuit and said point of introduction of said pulverulent material; and adjusting the throughput of pulverulent material in said carrier fluid flowing at a constant rate by application to said indicated pressure of an experimentally found relationship between the value of the throughput of pulverulent material and the indicated pressure at said second predetermined point of the circuit of said fluid, whereby the pressure indication constitutes a measure of the throughput of said pulverulent material.

2. A method for measuring the throughput of pulverulent material introduced into and suspended in a carrier fluid flowing at a constant rate of flow through a predetermined circuit, consisting in causing a first point constituting the output end of said circuit to be subjected to a constant pressure for any predetermined fluid output; causing indication of the amount of carrier fluid flowing through said circuit at a second point of said circuit located upstream of said point of introduction of said pulverulent material; adjusting at a third point located upstream of said second point of said circuit the flow of said carrier fluid in such a manner that it flows at a constant rate at said second point of said circuit; causing indication of the pressure of said fluid at a point of the circuit located between said third point of said circuit and said point of introduction of said pulverulent material; and adjusting the throughput of pulverulent material in said carrier fluid flowing at a constant rate by application to said indicated pressure of an experimentally found relationship between the value of the throughput of pulverulent material and the indicated pressure at said second predetermined point of the circuit of said fluid, whereby the pressure indication constitutes a measure of the throughput of said pulverulent material.

3. A method for measuring the throughput of pulverulent material introduced at a predetermined point into and suspended in a carrier fluid flowing at a constant rate of flow through a predetermined circuit, the output end of which constitutes a first point opening into the atmosphere, comprising causing indication of the amount of carrier fluid flowing through said circuit at a second point of said circuit located upstream of said point of introduction of said pulverulent material; adjusting at a third point located upstream of said second point of said circuit the flow of said carrier fluid in such a manner that it flows at a constant rate at said second point of said circuit; causing indication of the pressure of said fluid at a point of the circuit located between said third point of said circuit and said point of introduction of said pulverulent material; and adjusting the throughput of pulverulent material in said carrier fluid flowing at a constant rate by application to said indicated pressure of an experimentally found relationship between the value of the throughput of pulverulent material and the indicated pressure at said second predetermined point of the circuit of said fluid, whereby the pressure indication constitutes a measure of the throughput of said pulverulent material.

4. An arrangement for measuring the throughput of pulverulent material suspended in a fluid, comprising a circuit; means for introducing a carrier fluid at a constant rate of flow into one end of said circuit; means for injecting pulverulent material at an adjustable rate into a first point of said circuit; means for indicating the amount of carrier fluid flowing through said circuit at a second point of said circuit located upstream of said first point; adjusting means for adjusting at a third point located upstream of said second point the flow of said carrier fluid in such a manner that it flows at a constant rate at said second point of said circuit; pressure gauge means for measuring the pressure of the fluid at a point of said circuit located between said first and said third point of said circuit; and means for maintaining a constant pressure for any predetermined fluid output at a predetermined point of the circuit downstream of said first point.

References Cited in the file of this patent

UNITED STATES PATENTS

| 965,274 | Billings | July 26, 1910 |
| 1,677,691 | Smith | July 17, 1928 |
| 1,897,870 | Stewart et al. | Feb. 14, 1933 |

OTHER REFERENCES

Pages 142–144—"Elementary Engineering Thermodynamics," a textbook by V. W. and G. A. Young, published by McGraw-Hill in 1941.